United States Patent [19]
Harling et al.

[11] Patent Number: 4,918,471
[45] Date of Patent: Apr. 17, 1990

[54] FILM SPEED CODE CHANGER FOR USE WITH AN ENCODED FILM CARTRIDGE

[76] Inventors: Roy E. Harling, 1914 Corinth Ave., Los Angeles, Calif. 90025; Timothy D. Skeer, 11902 Honeybrook St., Moorpark, Calif. 93021

[21] Appl. No.: 325,360
[22] Filed: Mar. 17, 1989
[51] Int. Cl.⁴ .............................................. G03B 7/00
[52] U.S. Cl. ...................................... 354/21; 354/275
[58] Field of Search ................. 354/21, 275; 352/78 C

[56] References Cited

U.S. PATENT DOCUMENTS

| | | | |
|---|---|---|---|
| 4,490,027 | 12/1984 | Frank et al. | 354/21 |
| 4,586,800 | 5/1986 | Tominaga et al. | 354/21 |
| 4,588,272 | 5/1986 | Hoda et al. | 354/21 |
| 4,693,574 | 9/1987 | Ohnuki et al. | 354/21 |
| 4,714,332 | 12/1987 | Eguchi et al. | 354/21 |
| 4,783,672 | 11/1988 | Wirtz | 354/21 |

Primary Examiner—Michael L. Gellner
Assistant Examiner—Brian W. Brown
Attorney, Agent, or Firm—W. Edward Johansen

[57] ABSTRACT

A film speed code changer for use with an encoded film cartridge which contains film. The encoded film cartridge has a coded surface with a conductive surface with a non-conductive region. The dimensions of the non-conductive region provide a film speed code. An automatic camera is able to read film speed data for the film. The film speed code changer includes a sheet of flexible material, a layer of adhesive material and a backing sheet. The sheet of flexible material has a conductive surface and a backing surface. The layer of adhesive material adheres to the backing surface of the sheet of flexible material. The backing sheet covers the layer of adhesive material and is peeled away so that the backing surface of the film speed changer can be adhered to the coded surface of the encoded film cartridge. The film speed code changer also include an insulating material is applied to form a non-conductive region on the conductive surface of the sheet of flexible material. The dimensions of the non-conductive region provide a changed film speed code which causes the automatic camera to read different film speed data for the film.

6 Claims, 1 Drawing Sheet

U.S. Patent
Apr. 17, 1990
4,918,471
Fig. 1.
Fig. 2.
Fig. 3.
Fig. 4.
Fig. 5.
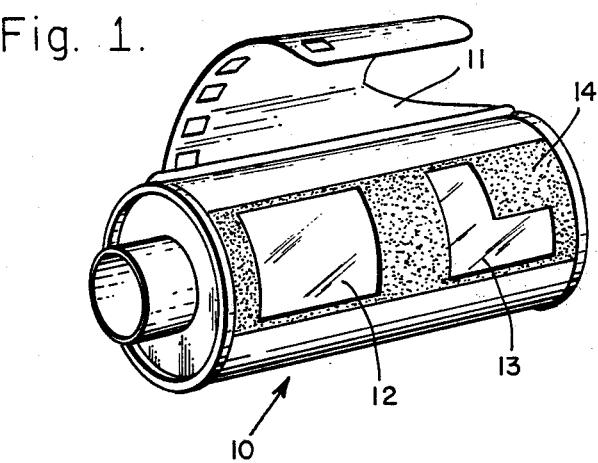
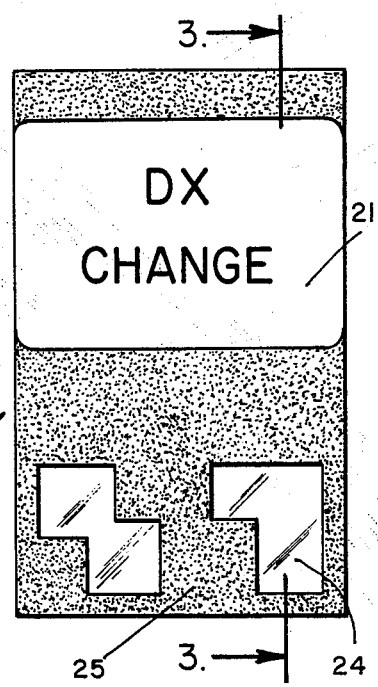
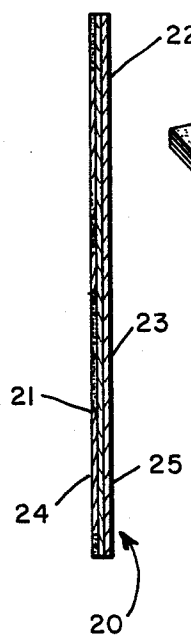
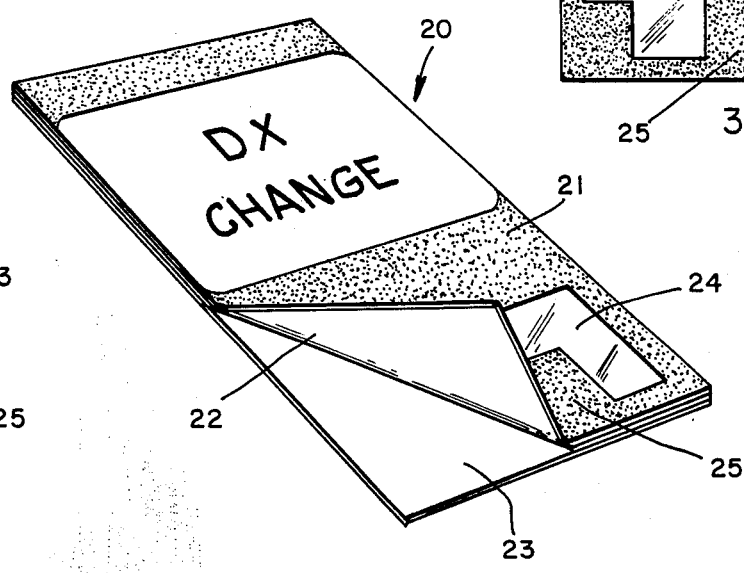
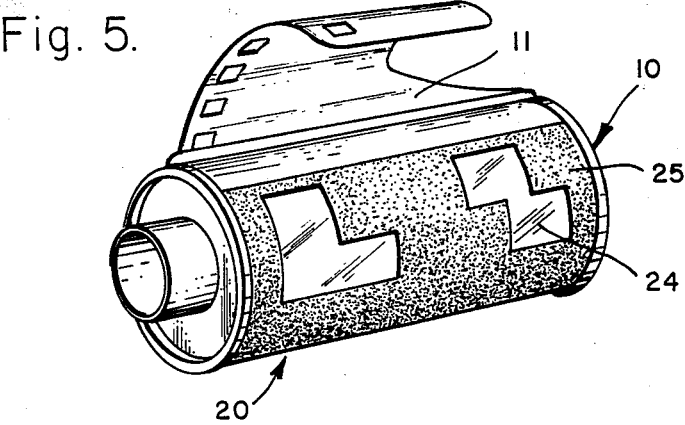

FILM SPEED CODE CHANGER FOR USE WITH AN ENCODED FILM CARTRIDGE

BACKGROUND OF THE INVENTION

1. Field of the Invention

This invention relates to an encoded film cartridge which enables an automatic camera to read film speed data for a film and more particularly to a film speed code changer which is used with the encoded film cartridge to cause the automatic camera to read different film speed data for the film so that the technique of either pushing or pulling may be used.

2. Description of the Prior Art

U.S. Pat. No. 4,714,332, entitled Film Data Reading Device, issued to Massharu Eguchi, Yoichi Tosaka, Ichiro Ohnuki, Yoshihiko Aihara and Akira Ishizaki on Dec. 22, 1987, teaches a film data reading device having a contact mechanism which reads film data by contacting a data code which is formed on a film cartridge. The contact mechanism is freely protrusible into and retractable from the loading chamber of the cartridge.

Pushing, which is described on page 417 of *Encyclopedia of Photography*, published by Pound Press, Inc., Crown Publishers, Inc. and the International Center of Photography in 1984, is the technique of exposing a film at higher than normal speed rating. This is most often done in order to photograph at marginal light levels, or to use a smaller aperture or a faster shutter speed than normal conditions allow. The practical effect of pushing is that the film is underexposed. Underexposure creates reduced contrast. Push processing is an extended development of a pushed film to restore the density and contrast in the middle tones and highlights that would be lost by normal development of the underexposed image. Pulling is the technique of exposing a film at lower than normal speed rating. This is most often done in order to photograph at excessive light levels, or to use a larger aperture or a slower shutter speed than normal conditions allow. The practical effect of pulling is that the film is overexposed. Pull processing is a shortened development of a pulled film to restore the density and contrast in the middletones and highlights that would be lost by normal development of the overexposed image.

U.S. Pat. No. 4,588,272, entitled Film Cartridges, Films and Camera Adapted for Use Therewith, issued to Takeo Hoda, Nobuyuki Taniguchi and Kiyoshi Seigenji on May 13, 1986, teaches a camera apparatus which is used with a film cartridge on which five first areas and a second area are formed. The APEX value Sv of the film speed of a film which is contained in the film cartridge. The five first areas have weights of 4, 2, 1, $\frac{2}{3}$ and $\frac{1}{3}$, respectively, and are conductive and nonconductive with the second area depending on the APEX value of the film speed. The camera apparatus includes a detector, a calculator and a circuit. The detector detects the first areas which are conductive with the second area. The calculator calculates the summation of the weights of the first areas detected by the detector and adds a predetermined constant value to the summation in order to generate a first signal directly indicative of the APEX value of the film speed which is represented by the first areas. The circuit receives the first signal.

U.S. Pat. No. 4,693,574, entitled Film Information Reading Device, issued to Ichiro Ohnuki, Yoshihiko Aihara, Yoichi Tosaka and Masaharu Eguchi on Sept. 15, 1987, teaches a reading device which reads information on the surface of a film cartridge. The reading device includes a first film information code detector and a second film information code detector. The film information code detector determines a condition of a first detecting surface of the film cartridge. The second film information code detector detects the reflection factor of a second detecting surface of the film cartridge. The information on the surface of the film cartridge includes at least information concerning the number of frames of the film and the films sensitivity. The detecting surfaces have a plurality of trains of information codes. The information codes are formed in plurality trains of patterns in the axial direction of the cartridge. The second film information code detector is arranged in a plurality of trains corresponding to the plurality of trains of information codes. The first film information code detector includes detection contact pins which are arranged to come into contact with the first detecting surface of the film cartridge. The contact pins contact an area about two times the information code area of the second detecting surface in order to detect either conductivity or con-conductivity between the contact pins.

U.S. Pat. No. 4,586,800, entitled Data Reading Device for Automatically Reading Film Cartridge Data, issued to Shinji Tominaga, Massaki Nakai, Norihiro Inoue, Akihiko Fujino, Manabu Inoue and Nobuyuki Taniguchi on May 6, 1986, teaches a data reading device for a camera which is loaded with a film cartridge having a code pattern. The code regions of the film cartridge are selectively conductive and nonconductive with a common region thereof in accordance with the film which is contained in the film cartridge. The data reading device determines whether predetermined regions of the code regions are conductive or nonconductive with the common region and reads the determination result to produce data in accordance therewith. The data reading device repeats the reading operation for a number of times at different moments and receives the plurality of data produced to produce data which is accurate with a high probability based thereon.

U.S. Pat. No. 4,783,672, entitled Method and Apparatus for Coding Photographic Materials, issued to John S. Wirtz on Nov. 8, 1988, teaches an apparatus for coding photosensitive material which includes an optical code pattern and an optical code reader. The optical code pattern is disposed on a cassette which contains a supply of photosensitive material. The optical code pattern defines a tertiary code. The optical code reader is associated with a photographic apparatus which receives the cassette. The optical code reader reads the code pattern when the cassette is inserted into the photographic apparatus to determine the type of photosensitive material which is contained in the cassette.

U.S. Pat. No. 4,490,027, entitled Magnetically Encoded Film Containers and Camera Adjusting Mechanisms Responsive Thereto, issued to Lee F. Frank and James K. Lee on Dec. 25, 1984, teaches a film container which bears magnetically encoded film information which is characterized by the information being encoded in the orientation of a macroscopic magnetic field which has strength sufficient to physically move a mechanical magnetic sensor. The encoded information is sensed either mechanically or electronically.

SUMMARY OF THE INVENTION

In view of the foregoing factors and conditions which are characteristic of the prior art it is the primary object of the present invention to provide a film speed code changer for use with an encoded film cartridge which causes an automatic camera to read different film speed data for the film so that the technique of either pushing or pulling may be used.

It is another object of the present invention to provide a simple and inexpensive film speed code changer for use with an encoded film cartridge.

In accordance with the present invention an embodiment of a film speed code changer for use with an encoded film cartridge is described. The encoded film cartridge has contains a film and has a coded surface with a conductive surface with a non-conductive region. The dimensions of the non-conductive region provide a film speed code. An automatic camera is able to read film speed data for the film. The film speed code changer includes a sheet of flexible material, a layer of adhesive material and a backing sheet. The sheet of flexible material has a conductive surface and a backing surface. The layer of adhesive material adheres to the backing surface of the sheet of flexible material. The backing sheet covers the layer of adhesive material and is peeled away so that the backing surface of the film speed changer can be adhered to the coded surface of the encoded film cartridge. The film speed code charger also include an insulating material is applied to form a non-conductive region on the conductive surface of the sheet of flexible material. The dimensions of the non-conductive region provide a changed film speed code which causes the automatic camera to read different film speed data for the film.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a perspective view of an encoded film cartridge which contains film and which has a coded surface with a conductive surface with a non-conductive region the dimensions of which provide a film speed code which an automatic camera is able to read film speed data for the film.

FIG. 2 is a top plan view of a film speed code changer which is a sheet of flexible material with a backing surface coated with a layer of adhesive material and covered with a backing sheet and which has been constructed in accordance with the principles of the present invention.

FIG. 3 is a cross-sectional view of the film speed code changer of FIG. 2 taken along the line 3—3 of FIG. 2.

FIG. 4 is a perspective view of the film speed code changer of FIG. 2 as the backing sheet is being peeled off from the layer of adhesive material.

FIG. 5 is a perspective view of an encoded film cartridge to which the backing surface of the film speed code changer of FIG. 2 is adhered to the coded surface in order to provide a changed film speed code so that the automatic camera reads different film speed data for the film.

DESCRIPTION OF THE PREFERRED EMBODIMENT

In order to best understand the present invention it is necessary to refer to the following description of its preferred embodiment in conjunction with the accompanying drawing. Referring to FIG. 1 in conjunction with FIG. 2 an encoded film cartridge 10 which contains film 11. The encoded film cartridge 10 has a coded surface 12 with a conductive surface 13 with a non-conductive region 14. The dimensions of the non-conductive region 14 provide a film speed code so that an automatic camera is able to read film speed data for the film.

Referring to FIG. 2 in conjunction with FIG. 3 and FIG. 4 a film speed code changer 20 includes a sheet 21 of flexible material, a layer 22 of adhesive material and a backing sheet 23. The sheet 21 of flexible material has a conductive surface 24 and a backing surface 25. The layer 22 of adhesive material adheres to the backing surface 25 of the sheet 21 of flexible material. The backing sheet 23 covers the layer 22 of adhesive material and is peeled away so that the Lacking surface 25 of the film speed changer 20 can be adhered to the coded surface 12 of the encoded film cartridge 10. The film speed code changer 20 also include an insulating material 26 is applied to form a non-conductive region on the conductive surface 24 of the sheet 21 of flexible material. The dimensions of the non-conductive region provide a changed film speed code. The preferred method of applying the insulating material 26 to the conductive surface 24 of the sheet 21 of flexible material is to silk-screen a non-conductive paint thereon in order to form a non-conductive region.

Referring to FIG. 5 in conjunction with FIG. 1 and FIG. 2 the film speed code changer 20 is used with the encoded film cartridge 10. The changed film speed code causes the automatic camera to read different film speed data for the film so that the technique of either pushing or pulling may be used.

In a second embodiment of the present invention the sheet of flexible material has a non-conductive surface. A conductive material is applied to form a conductive region on the non-conductive surface of the sheet of flexible material. The dimensions of the conductive region provide a changed film speed code. The preferred method of applying the conductive material to the non-conductive surface of the sheet of flexible material is to silk-screen a conductive paint thereon in order to form a conductive region.

In a third embodiment of the present invention the sheet of flexible material has a non-reflecting surface. A reflective material is applied to form a reflective region on the non-reflective surface of the sheet of flexible material. The dimensions of the reflective region provide a changed film speed code. The preferred method of applying the reflective material to the non-reflective surface of the sheet of flexible material is to silk-screen a reflective paint thereon in order to form a reflective region.

In a fourth embodiment of the present invention the sheet of flexible material has a reflecting surface. A non-reflective material is applied to form a non-reflective region on the reflective surface of the sheet of flexible material. The dimensions of the non-reflective region provide a changed film speed code. The preferred method of applying the non-reflective material to the reflective surface of the sheet of flexible material is to silk-screen a non-reflective paint thereon in order to form a non-reflective region.

From the foregoing it can be seen that a film speed code changer for use with an encoded film cartridge has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A film speed code changer for use with an encoded film cartridge which contains film and which has a coded surface with a conductive surface with a non-conductive region the dimensions of which provide a film speed code which enables an automatic camera to read film speed data for the film, said film speed code changer comprising:
    a. a sheet of flexible material having a conductive surface and a backing surface;
    b. adhering means for adhering said backing surface of said sheet of flexible material to the coded surface of the encoded film cartridge; and
    c. insulating means for forming a non-conductive region on said conductive surface of said sheet of flexible material, the dimensions of said non-conductive region provide a changed film speed code which causes the automatic camera to read different film speed data for the film.

2. A film speed code changer for use with an encoded film cartridge according to claim 1 wherein said insulating means comprises a non-conductive paint which has been silk-screened onto said conductive surface in order to form a non-conductive region.

3. A film speed code changer for use with an encoded film cartridge according to claim 1 wherein said adhering means comprises:

a. a layer of adhesive material which is disposed on said backing surface of said sheet of flexible material; and
    b. a backing sheet which covers said layer of adhesive material and which may be peeled away so that said backing surface can be adhered to the coded surface of the encoded film cartridge.

4. A film speed code changer for use with an encoded film cartridge which contains film and which has a coded surface to a conductive surface with a non-conductive region the dimensions of which provide a film speed code which enables an automatic camera to read film speed data for the film, said film speed code changer comprising:
    a. a sheet of flexible material having a non-conductive surface and a backing surface;
    b. adhering means for adhering said backing surface of said sheet of flexible material to the coded surface of the encoded film cartridge; and
    c. conducting means for forming a conductive region on said non-conductive surface of said sheet of flexible material, the dimensions of said conductive region provide a changed film speed code which causes the automatic camera to read different film speed data for the film.

5. A film speed code changer for use with an encoded film cartridge according to claim 4 wherein said conducting means comprises a conductive paint which has been silk-screened onto said non-conductive surface in order to form a conductive region.

6. A film speed code changer for use with an encoded film cartridge according to claim 4 wherein said adhering means comprises:
    a. a layer of adhesive material which is disposed on said backing surface of said sheet of flexible material; and
    b. a backing sheet which covers said layer of adhesive material and which may be peeled away so that said backing surface can be adhered to the coded surface of the encoded film cartridge.

* * * * *